United States Patent
Wakrat et al.

(10) Patent No.: US 8,826,051 B2
(45) Date of Patent: Sep. 2, 2014

(54) DYNAMIC ALLOCATION OF POWER BUDGET TO A SYSTEM HAVING NON-VOLATILE MEMORY AND A PROCESSOR

(75) Inventors: Nir J. Wakrat, Los Altos, CA (US); Kenneth Herman, San Jose, CA (US); Matthew Byom, Campbell, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 12/843,423

(22) Filed: Jul. 26, 2010

(65) Prior Publication Data

US 2012/0023351 A1    Jan. 26, 2012

(51) Int. Cl.
*G06F 1/00* (2006.01)
*G06F 1/26* (2006.01)

(52) U.S. Cl.
USPC ........... 713/322; 713/300; 713/320; 713/310; 713/340

(58) Field of Classification Search
USPC .................. 709/224; 713/310, 320, 300, 340; 711/114; 455/402, 522
See application file for complete search history.

(56) References Cited

U.S. PATENT DOCUMENTS

| | | | |
|---|---|---|---|
| 5,724,592 A | 3/1998 | Garner | |
| 6,233,693 B1 | 5/2001 | Berglund et al. | |
| 6,748,441 B1 | 6/2004 | Gemmell | |
| 6,748,493 B1 | 6/2004 | Arroyo et al. | |
| 6,857,055 B2 | 2/2005 | Jeddeloh | |
| 7,305,572 B1 | 12/2007 | Burroughs et al. | |
| 7,440,215 B1 | 10/2008 | Sardella et al. | |
| 7,681,054 B2 * | 3/2010 | Ghiasi et al. | 713/320 |
| 2002/0181311 A1 | 12/2002 | Miyauchi et al. | |
| 2003/0126475 A1 | 7/2003 | Bodas | |
| 2005/0125703 A1 | 6/2005 | Lefurgy et al. | |
| 2005/0210304 A1 * | 9/2005 | Hartung et al. | 713/320 |
| 2005/0272402 A1 * | 12/2005 | Ferentz et al. | 455/402 |
| 2005/0283624 A1 * | 12/2005 | Kumar et al. | 713/300 |
| 2006/0053324 A1 * | 3/2006 | Giat et al. | 713/300 |
| 2006/0082222 A1 | 4/2006 | Pincu et al. | |
| 2006/0184758 A1 | 8/2006 | Satori et al. | |
| 2006/0271678 A1 * | 11/2006 | Jessup et al. | 709/224 |
| 2006/0288241 A1 * | 12/2006 | Felter et al. | 713/300 |
| 2007/0067657 A1 * | 3/2007 | Ranganathan et al. | 713/320 |
| 2007/0211551 A1 | 9/2007 | Yogev et al. | |
| 2007/0260815 A1 * | 11/2007 | Guha et al. | 711/114 |
| 2008/0178019 A1 * | 7/2008 | McGrane et al. | 713/320 |
| 2008/0219078 A1 | 9/2008 | Kamiyama | |
| 2008/0301475 A1 * | 12/2008 | Felter et al. | 713/300 |
| 2009/0113221 A1 * | 4/2009 | Holle et al. | 713/310 |

(Continued)

FOREIGN PATENT DOCUMENTS

| | | |
|---|---|---|
| EP | 0878755 | 11/1998 |
| EP | 0955573 | 11/1999 |

(Continued)

*Primary Examiner* — Thomas Lee
*Assistant Examiner* — Aurel Prifti
(74) *Attorney, Agent, or Firm* — Van Court & Aldridge LLP

(57) ABSTRACT

Systems and methods are disclosed for dynamically allocating power for a system having non-volatile memory. A power budgeting manager of a system can determine if the total amount of power available for the system is below a predetermined power level (e.g., a low power state). While the system is operating in the low power state, the power budgeting manager can dynamically allocate power among various components of the system (e.g., a processor and non-volatile memory).

17 Claims, 6 Drawing Sheets

(56) References Cited

U.S. PATENT DOCUMENTS

| | | |
|---|---|---|
| 2010/0036998 A1 | 2/2010 | Ben-Rubi |
| 2010/0042853 A1* | 2/2010 | Diab et al. ............... 713/300 |
| 2010/0049905 A1 | 2/2010 | Ouchi |
| 2010/0162006 A1* | 6/2010 | Therien et al. ............ 713/300 |
| 2010/0162024 A1* | 6/2010 | Kuris et al. ............... 713/340 |
| 2010/0293439 A1 | 11/2010 | Flynn et al. |
| 2010/0293440 A1 | 11/2010 | Thatcher et al. |
| 2010/0332863 A1* | 12/2010 | Johnston .................. 713/300 |
| 2011/0165907 A1* | 7/2011 | Odigie et al. ............. 455/522 |
| 2011/0173462 A1 | 7/2011 | Wakrat et al. |
| 2011/0252247 A1* | 10/2011 | Yokoyama ................ 713/300 |

FOREIGN PATENT DOCUMENTS

| | | |
|---|---|---|
| EP | 1688866 | 8/2006 |
| EP | 1818830 | 8/2007 |
| JP | 11-316625 | 11/1999 |
| JP | 2000-214966 | 8/2000 |
| JP | 2001-100868 | 4/2001 |
| JP | 2003-515221 | 4/2003 |
| KR | 10-0350284 | 8/2002 |
| KR | 10-2009-0103926 | 10/2009 |
| WO | 03/029951 | 4/2003 |
| WO | 2006/059698 | 6/2006 |
| WO | 2007/024396 | 3/2007 |
| WO | 2008/017624 | 2/2008 |

* cited by examiner

DYNAMIC ALLOCATION OF POWER BUDGET TO A SYSTEM HAVING NON-VOLATILE MEMORY AND A PROCESSOR

FIELD OF THE INVENTION

This can relate to dynamically allocating power for a system having non-volatile memory based on one or more power states of the system.

BACKGROUND OF THE DISCLOSURE

NAND flash memory, as well as other types of non-volatile memories ("NVMs"), are commonly used for mass storage. For example, electronic devices such as portable media players or cellular telephones often include raw flash memory or a flash card to store music, videos, and other media.

An electronic device may operate using power supplied by an internal power source such as a battery, which may require charge from time to time to replenish the internal power source. The internal power source may be recharged by coupling the electronic device to a power charging device (e.g., by physically connecting terminals of the power charging device to terminals of the electronic device). When the power charging device is first coupled to the electronic device, however, there may be a time interval during which the electronic device can only draw a limited amount of power from the power charging device. During this time interval, certain components or a combination of such components of the electronic device may not be able to function, or may be handicapped in their ability to fully function, when operating under this limited power budget.

SUMMARY OF THE DISCLOSURE

Systems and methods are disclosed for dynamically allocating power for a system based on one or more power states. The systems may include an electronic device (e.g., a portable media player or a cellular telephone) that may include a processor, a non-volatile memory ("NVM"), and a power budgeting manager.

The NVM can be memory of any suitable type, such as, for example, flash memory (e.g., NAND flash memory). The NVM may include one or more NVM dies and associated circuitry to enable accessing and operation of those dies. In some embodiments, the NVM may also include its own controller and other components such as an error correction code module.

The power budgeting manager (e.g., implemented on a device processor or on the NVM) can monitor the amount of available power and dynamically allocate a power budget to each of the processor, the NVM, and any other component in the system or to components within the processor and/or the NVM. For example, in one embodiment, the power budgeting manager can detect that the system is operating in a low power state. A low power state, as defined herein, is when the system is receiving a low amount of power (e.g., a pre-determined power level of 100 mA) from an external power charging source and where an internal power source (e.g., a battery) of the system is unable to power the electronic device. Such a low power state may exist, for example, during a Universal Serial Bus ("USB") protocol handshaking sequence between the electronic device and the external power charging device. In response to detecting the low power state, the power budgeting manager can dynamically allocate a respective power budget to each component of one or more components of the system. For example, the power budgeting manager can dynamically allocate a power budget to each of the processor and the NVM such that the processor and the NVM can collectively operate without exceeding the power available during the low power state.

Power budgets for respective components (e.g., processor or NVM) may be enforced using any number of techniques. For example, in one embodiment, the power budgeting manager can stall the processor, which prevents the processor from operating, thereby conserving power to adhere to a power budget. The processor can be stalled by a number of techniques, such as clock gating (e.g., by disabling one or more portions of the processor circuitry). As another example, the processor can be stalled by throttling its clock speed (e.g., reducing its clock speed to a predetermined level). As yet another example, the power budgeting manager can control power consumption of the NVM by, for instance, subdividing power to one or more components of the NVM.

The power budgeting manager can also interrupt the stalling of the processor using any suitable technique. For example, the power budgeting manager can interrupt the stalling of the processor in response to receiving one or more flags issued by a NVM controller, where the one or more flags can indicate when one or more memory operations have completed. As another example, the power budgeting manager can interrupt the stalling of the processor in response to receiving an interrupt request from the NVM controller.

In some embodiments, if the power budgeting manager detects that the current power level exceeds the power level of the low power state, the power budgeting manager can remove the respective power budget allocated to each component of the one or more components of the system. After the respective power budgets are removed, components of the system may be able to draw as much current as needed from the external power charging device. In other embodiments, the power budgeting manager can monitor the power consumption of various components of the system and allocate power accordingly.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
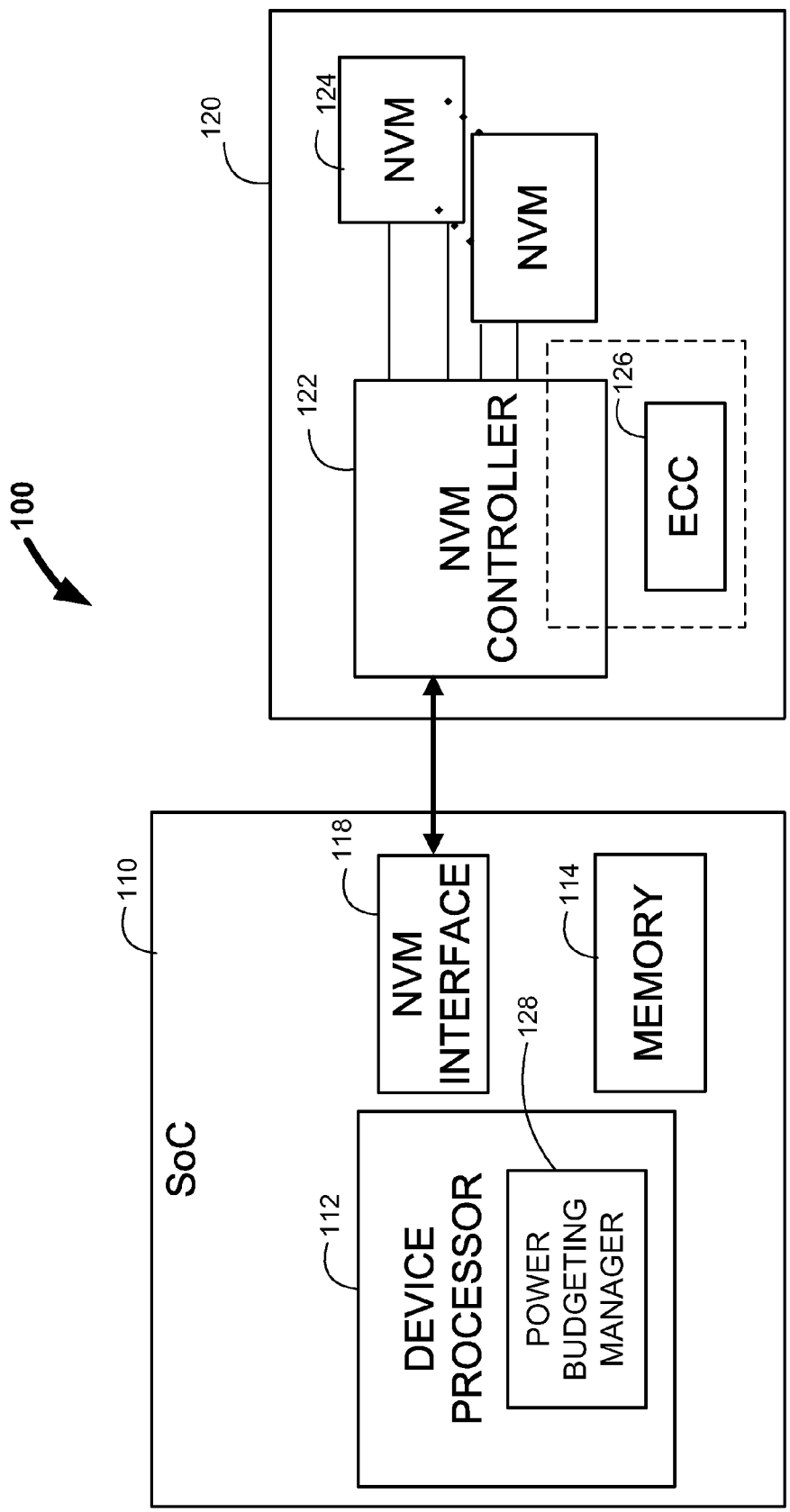
FIGS. 1 and 2 show schematic views of electronic devices configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. NVM 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof.

In some embodiments, NVM 120 can include NVM controller 122 for accessing and managing NVM dies 124 over internal channels (e.g., one or more data paths between NVM controller 122 and NVM dies 124) using internal chip select signals. In some cases, NVM controller 122 can selectively enable any die of NVM dies 124. For example, in response to receiving a request (e.g., a read, program, or erase request) from device processor 112 to access a particular die of NVM dies 124, NVM controller 122 can selectively enable the die requested by device processor 112.

NVM controller 122 can perform memory management functions such as wear leveling, bad block management, and logical-to-physical translation operations. NVM 120 can include an error correction code ("ECC") engine 126 for detecting and correcting data errors (e.g., flipped bits). ECC engine 126 is shown with a dashed-line box to indicate that its function can be implemented in different locations. In some embodiments, ECC engine 126 can be implemented as a hardware component in NVM controller 122 or as a software component executed by NVM controller 122. In some embodiments, ECC engine 126 can be a stand-alone module in NVM 120.

It is understood that one or more functions implemented by NVM controller 122 can be implemented by SoC 110. Thus, in some embodiments, NVM controller 122 may be included as part of SoC 110. In such an embodiment, NVM 120 can include dies 124 and associated circuitry (e.g., charge pumps, row and column decoders, etc.), but would not include an NVM controller.

NVM dies 124 can be organized into "blocks," which are the smallest unit of erase, and further organized into "pages," which are the smallest programmable and readable unit. Each die 124 can include multiple blocks that can be arranged in one or more planes (or banks). Blocks from each plane or die may be virtually linked together to form "super blocks." Each memory location (e.g., page or block) of NVM dies 124 can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can, for example, include other components, such as a power supply or any user input or output components which are not depicted in FIG. 1 to prevent overcomplicating the figure.

SoC 110 can include device processor 112, memory 114, and NVM interface 118. Device processor 112 can control the general operations and functions of SoC 110 and the other components of SoC 110 or device 100. For example, responsive to user inputs and/or the instructions of an application or operating system, device processor 112 can issue read or write commands to NVM interface 118 to obtain data from or store data in NVM 120. That is, NVM interface 118 can enable communications between NVM 120 and device processor 112. For clarity, data that device processor 112 may request for storage or retrieval may be referred to as "user data," even though the data may not be directly associated with a user or user application. Rather, the user data can be any suitable sequence of digital information generated or obtained by device processor 112 (e.g., via an application or operating system).

Device processor 112 can include any combination of hardware, software, and firmware, and any components, circuitry, or logic operative to drive the functionality of electronic device 100. For example, device processor 112 can include one or more processors that operate under the control of software/firmware stored in NVM 120 or memory 114.

In some embodiments, device processor 112 can include power budgeting manager 128, which can dynamically allocate power budgets to one or more components of electronic device 100. The one or more components can include, for example, device processor 112, NVM 120, NVM interface 118, and any other suitable component(s) of electronic device 100. In some embodiments, the power budgets can be allocated based on the total amount of power that is available to electronic device 100 or available to SoC 110 and NVM 120. Although power budgeting manager 128 is shown as being implemented on device processor 112 in FIG. 1, persons skilled in the art will appreciate that power budgeting manager 128 may in addition or instead be implemented on NVM controller 122. Dynamic power allocations will be discussed in more detail in connection with FIGS. 3-5.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from NVM 120. In some embodiments, memory 114 may act as the main memory for any processors implemented as part of device processor 112.

NVM interface 118 may include any suitable combination of hardware, software, and/or firmware configured to act as an interface or driver between device processor 112 and NVM 120. For any software modules included in NVM interface 118, corresponding program code may be stored in NVM 120 or memory 114.

NVM interface 118 can perform a variety of functions that allow device processor 112 to access NVM 120 and to manage the memory locations (e.g., pages, blocks, super blocks, integrated circuits) of NVM 120 and the data stored therein (e.g., user data). For example, NVM interface 118 can interpret the read or write commands from device processor 112, perform wear leveling, and generate read and program instructions compatible with the bus protocol of NVM 120.

While NVM interface 118 and device processor 112 are shown as separate modules, this is intended only to simplify the description of the embodiments of the invention. It should be understood that these modules may share hardware components, software components, or both. For example, a processor implemented as part of device processor 112 may execute a software-based memory driver for NVM interface 118. Accordingly, portions of device processor 112 and NVM interface 118 may sometimes be referred to collectively as "processor."

FIG. 1 illustrates an electronic device where NVM 120 may have its own controller (e.g., NVM controller 122). In some embodiments, electronic device 100 can include a target device, such as a flash or SD card, that includes NVM 120 and some or all portions of NVM interface 118 (e.g., a translation layer, discussed below). In these embodiments, SoC 110 or device processor 112 may act as a host controller for the target device. For example, as the host controller, SoC 110 can issue read and write requests to the target device.

Figure 2:
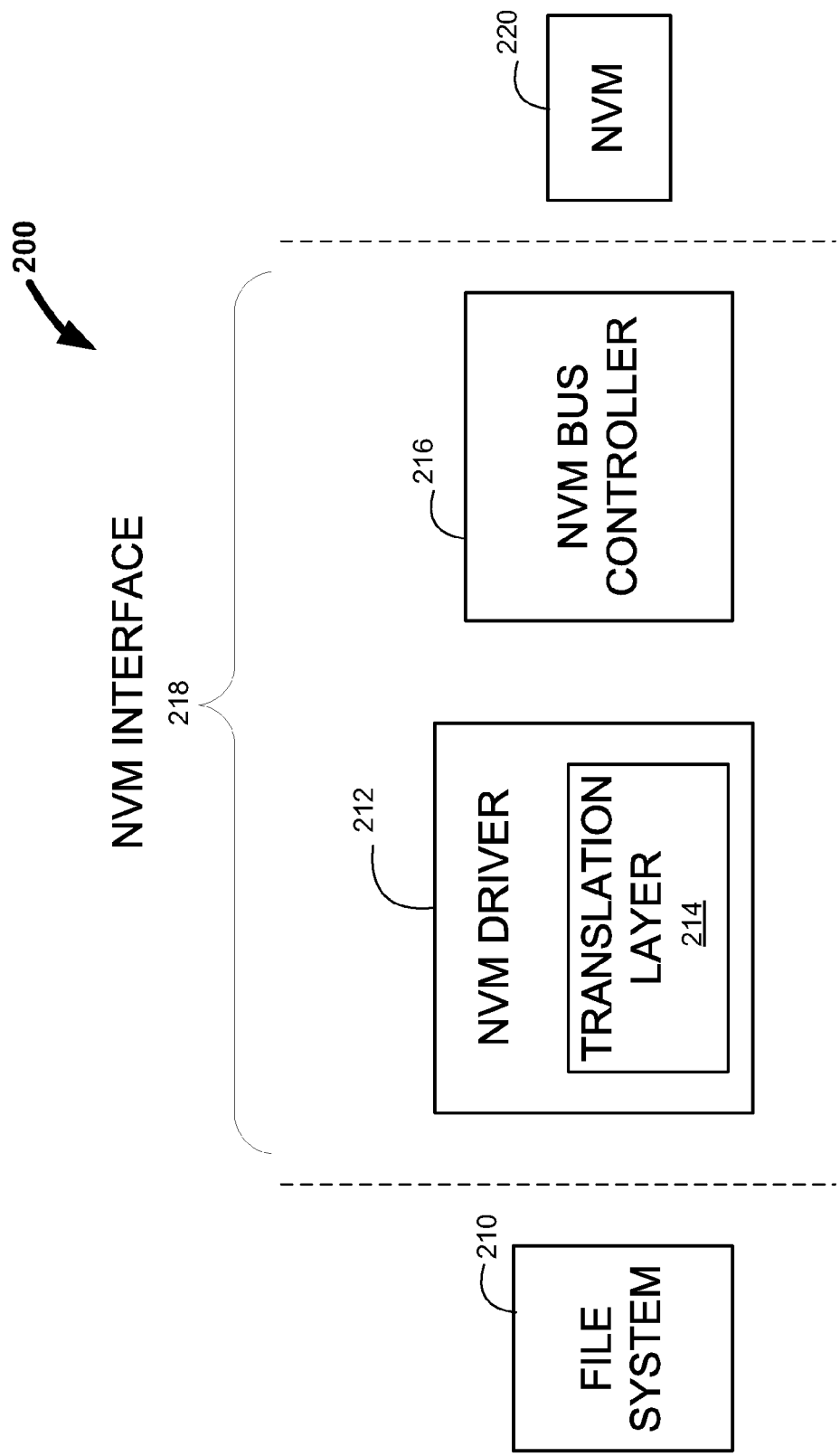

FIG. 2 is a schematic view of electronic device 200, which may illustrate in greater detail some of the firmware, software and/or hardware components of electronic device 100 (FIG. 1) in accordance with one or more embodiments. Electronic device 200 may have any of the features and functionalities described above in connection with device 100 shown in FIG. 1, and vice versa. Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system and may be part of the operating system of electronic device 200 (e.g., part of device processor 112 of FIG. 1). In some embodiments, file system 210 may include a flash file system, which may provide a logical to physical mapping of pages. File system 210 may perform some or all of the functionalities of NVM driver 212 discussed below, and therefore file system 210 and NVM driver 212 may or may not be separate modules.

File system 210 may manage file and folder structures for the application and/or operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device or other techniques that are specific to flash-based devices. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write operation, translation layer 214 can map the provided logical address to a free, erased physical location on NVM 220. On a read operation, translation layer 214 can use the provided logical address to determine the physical address at which the requested data is stored. Because each NVM may have a different layout depending on the size or vendor of the NVM, this mapping operation may be memory and/or vendor specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access requests (e.g., program, read, and/or erase requests). Bus controller 216 may act as the hardware interface to NVM 220, and can communicate with NVM 220 using the bus protocol, the data rate, and/or other specifications of NVM 220.

NVM interface 218 may manage NVM 220 based on memory management data, sometimes referred to herein as "metadata." The metadata may be generated by NVM driver 212 or may be generated by a module operating under the control of NVM driver 212. For example, metadata can include any information used for managing the mapping between logical and physical addresses, bad block management, wear leveling, "ECC" data, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location. For example, the metadata may contain a flag that indicates whether the stored data is good data.

NVM interface 218 may store a logical address and associated user information itself so that, on power-up of NVM 220 or during operation of NVM 220, electronic device 200 can determine what data resides at that specific location. In particular, because file system 210 may reference the user data according to its logical address and not its physical address, NVM interface 218 may store the user data and logical address together to maintain their association. For example, in embodiments where NVM interface 218 maps logical sectors directly to physical pages, NVM interface 218 may store logical-to-physical mappings in pages in the NVM, as well as the information itself.

Figure 3:
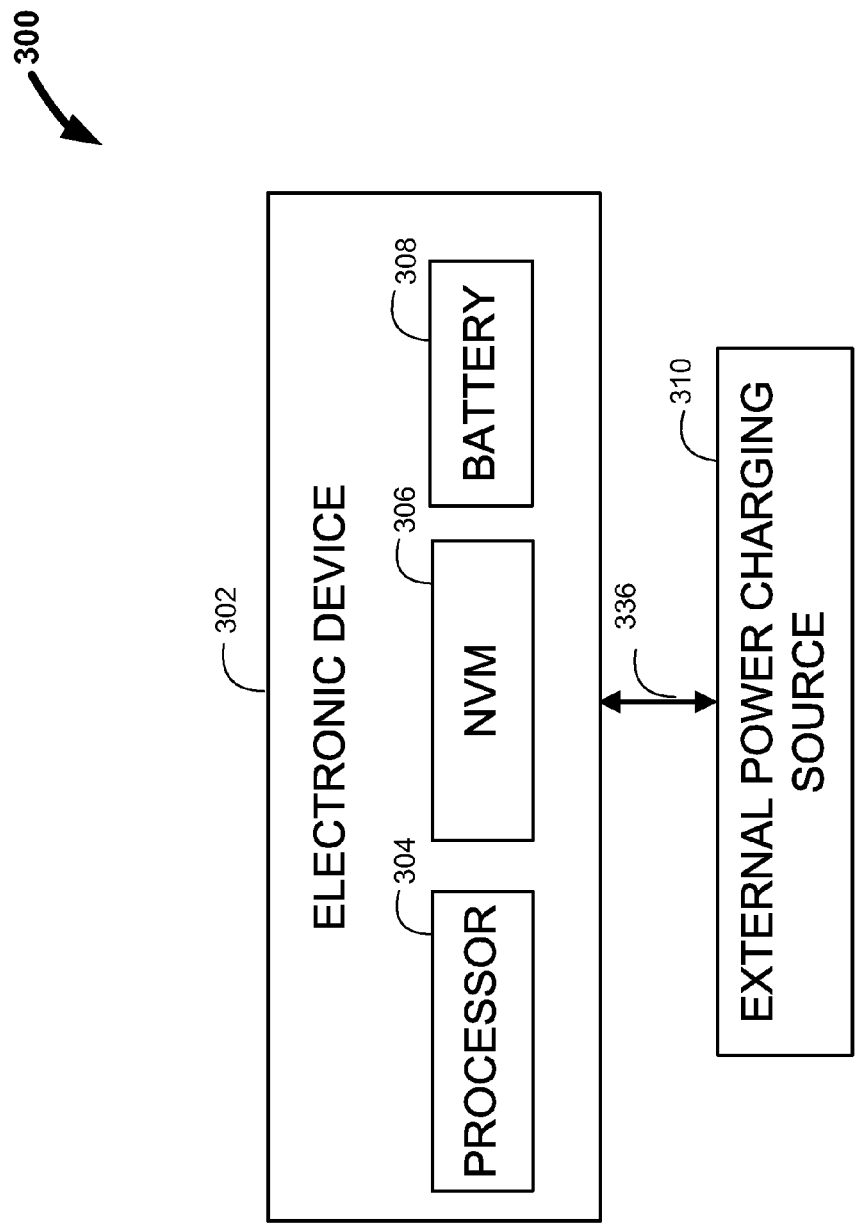
FIG. 3 shows a schematic view of an illustrative electronic system configured in accordance with various embodiments of the invention.

Referring now to FIG. 3, a schematic view of an illustrative electronic system is shown. Electronic system 300 can include electronic device 302 and external power charging source 310. In some embodiments, electronic device 302 can be the same as or substantially similar to electronic device 100 of FIG. 1 and/or electronic device 200 of FIG. 2.

For example, electronic device 302 can include a host system or processor 304 (e.g., SoC 110 of FIG. 1) and NVM 306 (e.g., NVM 120 of FIG. 1 or NVM 220 of FIG. 2). In some cases, electronic device 302 can include battery 308, which, when charged to at least a pre-determined level, can power electronic device 302. However, when electronic device 302 has been left uncharged for an extended period of time, battery 308 may eventually run out of substantially all of its charge. In such a state, battery 308 may be unable to power electronic device 302 and one or more of its components.

In some embodiments, electronic device 302 can be recharged by coupling electronic device 302 to external power charging device 310 via one or more power connections 336. External power charging device 310 can include any suitable electronic charging device or system capable of supplying power to electronic device 302. For example, external power charging device 310 can include a laptop computer, a power supply, or a docking station. Moreover, power connection 336 can include, for example, a Universal Serial Bus ("USB") connection, a USB 2.0 connection, a serial connection, a parallel connection, a FireWire connection, any other suitable wired or wireless power connection, and/or any combination thereof.

However, when electronic device 302 is first coupled to external power charging device 310 via power connection 336, the amount of current that may be drawn from external power charging device 310 may be limited. For example, if electronic device 302 is coupled to external power charging device 310 using a USB connection, electronic device 302 may first need to complete a handshaking phase with external power charging device 310 before a maximum amount of power can be drawn from external power charging device 310 (e.g., a maximum current of 500 mAmps, 1 Amp, or 2 Amps). The handshaking phase may be a negotiation process between electronic device 302 and external power charging device 310 to determine how much current electronic device 302 can draw from power charging device 310. During the handshaking phase, a limited amount of power is supplied, but after the handshake is complete, the "agreed" upon power level can be provided.

As a result, prior to completing the handshaking phase, electronic device 302 may only be able to draw a limited amount of power (e.g., a maximum current of 100 mAmps versus a maximum current of 500 mAmps during normal operations) from external power charging device 310. Thus, given the limited power budget, processor 304 may need to dynamically allocate power among its various components (e.g., a NVM and a processor) in order to ensure sufficient power is provided to enable operation of selective component(s).

Persons skilled in the art will appreciate that in addition to, or instead of, dynamically allocating power to processor 304 and NVM 306, power can be dynamically allocated for any other component(s) of electronic device 302. Persons skilled in the art will also appreciate that although this discussion is directed to a low power state arising from the USB protocol, electronic device 302 can respond to any low power scenario by dynamically allocating power among its various components. Thus, a low power state can be any state where an internal power source (e.g., battery 308) is unable to provide enough power to electronic device 302 so that electronic device 302 can operate in its normal operating modes (e.g., playing music or facilitating cell phone calls). At the same time, an external power charging device (e.g., external power charging device 310) may also be providing a low amount of power (e.g., a pre-determined power level of 100 mA) to electronic device 302.

Figure 4:
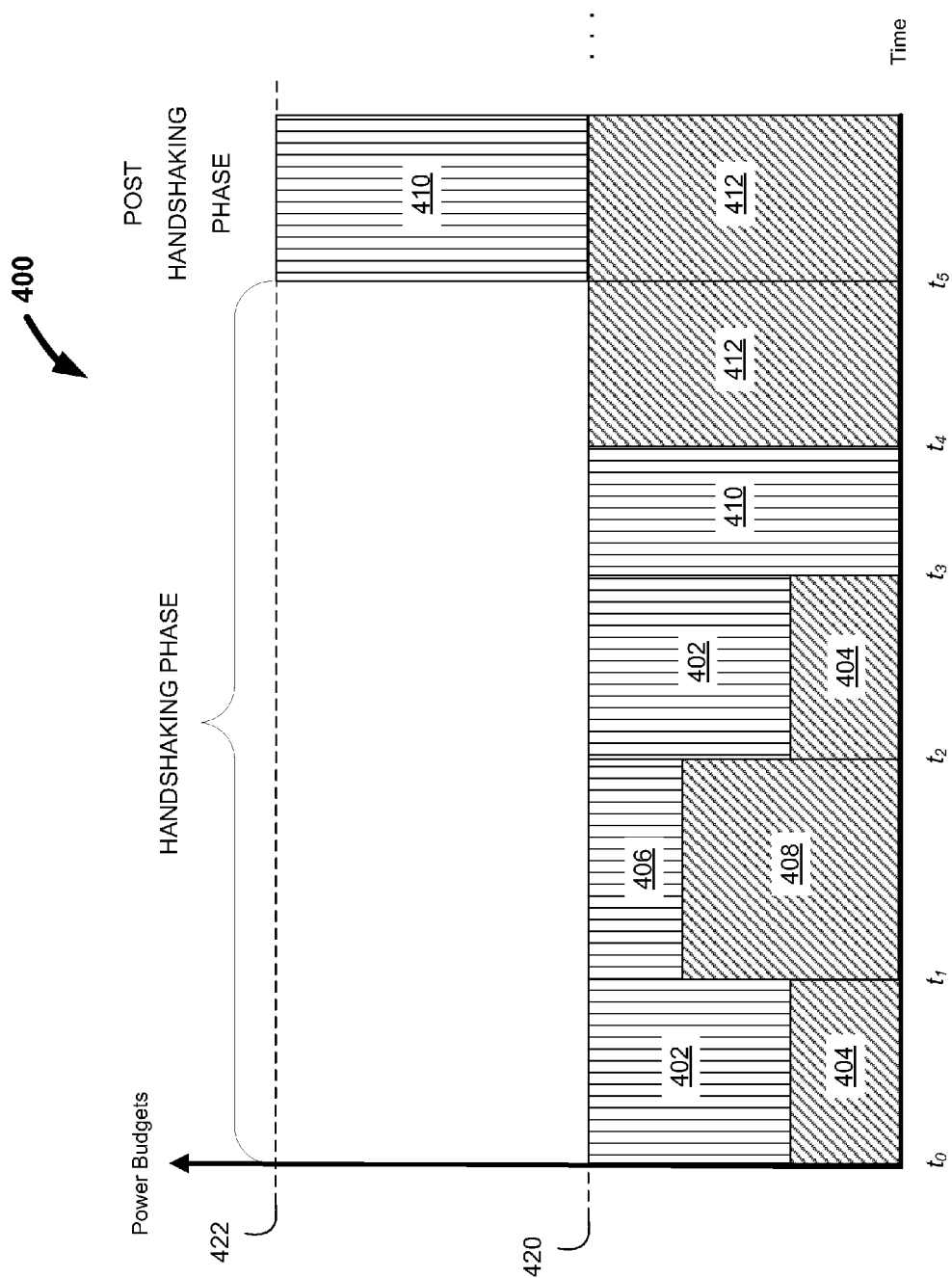
FIG. 4 shows a graph of an illustrative power budget allocation for components of an electronic device in accordance with various embodiments of the invention.

FIG. 4 shows a graph of an illustrative power budget allocation 400 for components of an electronic device (e.g., electronic device 100 of FIG. 1, electronic device 200 of FIG. 2, or electronic device 302 of FIG. 3). Persons skilled in the art will appreciate that time intervals $t_0$ to $t_5$ are not drawn to scale, and therefore, in some cases, some time intervals may actually be much longer or shorter as compared to other time intervals.

At time $t_0$, a power budgeting manager (e.g., power budgeting manager 128 of FIG. 1) can determine that the memory system is operating in a low power state. As a result, the power budgeting manager can allocate power budget 402 to a processor (e.g., SoC 110 of FIG. 1 or processor 304 of FIG. 3) and power budget 404 to an NVM (e.g., NVM 120 of FIG. 1, NVM 220 of FIG. 2, or NVM 306 of FIG. 3). The combination of power budgets 402 and 404 can be equal to, or less than, power level 420. Between time t0 and t5, power level 420 can be the power level provided during the handshaking phase (e.g., 100 mAmp), and after time t5, power level 422 can be the power level provided during after the handshaking phase is complete (e.g., 500 mAmp, 1 Amp, or 2 Amps). In addition, since the processor may need to use more power initially (e.g., additional power for issuing one or more requests), power budget 402 may be higher than power budget 404.

Then, between time $t_0$ and time $t_1$, the processor may issue a request (e.g., a read, erase, or program request) to access the NVM. In one embodiment, the processor may issue a request for the NVM to load one or more programs (e.g., an operating system) for a system boot-up.

After the request has been issued, at time $t_1$, the power budgeting manager can allocate power budgets 406 and 408 to the processor and the NVM, respectively. The combination of power budgets 406 and 408 can be equal to, or less than, power level 420.

In some cases, a lower amount of power may be allocated to the processor at time t/because the processor may not need to perform any other significant operations after issuing the request. Therefore, power budget 406 may be lower than power budget 402.

In contrast, because the NVM may be performing most of the system operations after receiving a request from the processor (e.g., loading one or more programs for a system boot-up), the NVM may require additional power as compared to the processor. Therefore, power budget 408 may be higher than power budget 406.

In some embodiments, in order for the processor to meet power budget 406 between time $t_1$ and time $t_2$, the power budgeting manager can stall the processor. For example, the power budgeting manager can stall the processor by clock gating the processor (e.g., by disabling one or more portions of the processor circuitry). As another example, the power budgeting manager can stall the processor by throttling the clock speed of the processor (e.g., reducing the clock speed to a minimum level).

Then, at time $t_2$, the power budgeting manager may interrupt the stalling of the processor in response to receiving an interrupt request. For example, the power budgeting manager may receive an interrupt request from one or more components of an electronic system (e.g., electronic system 300 of FIG. 3). In some embodiments, the power budgeting manager may have received an interrupt request from the NVM. For example, a NVM controller (e.g., NVM controller 122 of FIG. 1) can provide an interrupt request to the processor instructing the processor to operate at a higher power level. As another example, the NVM controller can issue one or more flags, where the one or more flags can indicate when one or more memory operations have completed.

If the power budgeting manager determines that a request to interrupt the stalling of the processor has been received, the power budgeting manager can allocate power budgets 402 and 404 to the processor and the NVM, respectively. Thus, in some embodiments, the power budgets allocated between time $t_2$ and time $t_3$ can be the same as or similar to the power budgets allocated between time $t_0$ and time $t_1$.

A higher amount of power may be allocated to the processor at time $t_2$ because the processor may require additional power in order to continue to perform system operations (e.g., execute one or more system applications). Correspondingly, because the processor may be performing most of the system operations after the stalling has been interrupted, power budget 402 may be higher than power budget 404.

Persons skilled in the art will appreciate that the power budgets shown in power budget allocation 400 are merely illustrative, and that the actual power budgets allocated to each component of the system can depend on one or more factors. The one or more factors can include, for instance, the current state of the system, one or more future states of the system, the total power available, the type of request issued by the processor (e.g., a read, program, or erase request), any other suitable factor, and/or any combination thereof.

Thus, for example, between time $t_3$ and time $t_4$, the power budgeting manager can allocate almost all of the available power to the processor (e.g., power budget 410), which can allow the processor to perform additional operations. Moreover, between time $t_4$ and time $t_5$, the power budgeting manager can allocate almost all of the available power to the NVM (e.g., power budget 412), which can allow the NVM to perform additional operations.

Then, at time $t_5$, the handshaking operation is complete and the power budgeting manager is no longer limited to operating in the low power state. At this point, the power budgeting manager can allocate power according to new power level 422.

Figure 5:
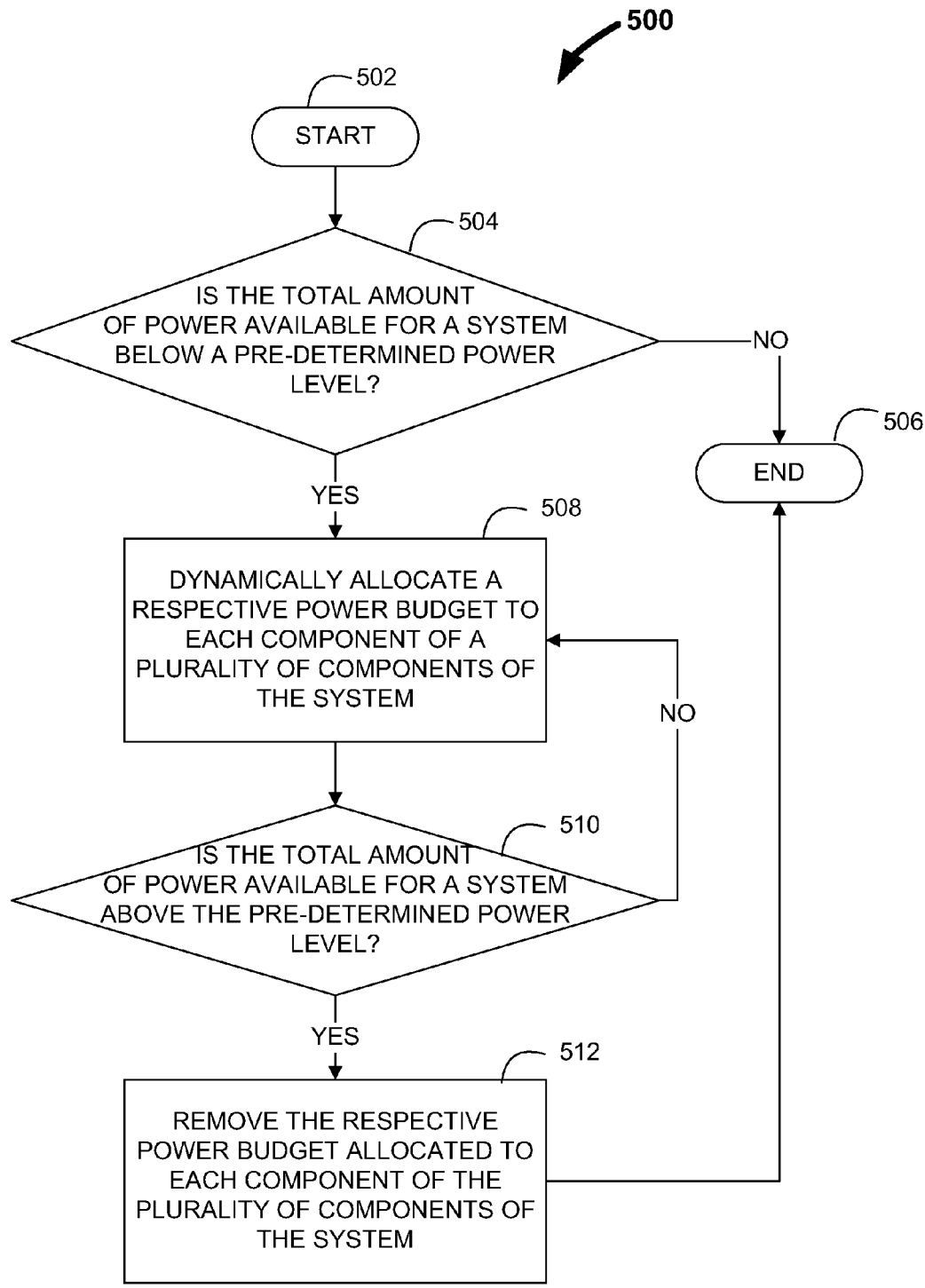
FIG. 5 shows a flowchart of an illustrative process for dynamic power allocation in accordance with various embodiments of the invention.
Figure 6:
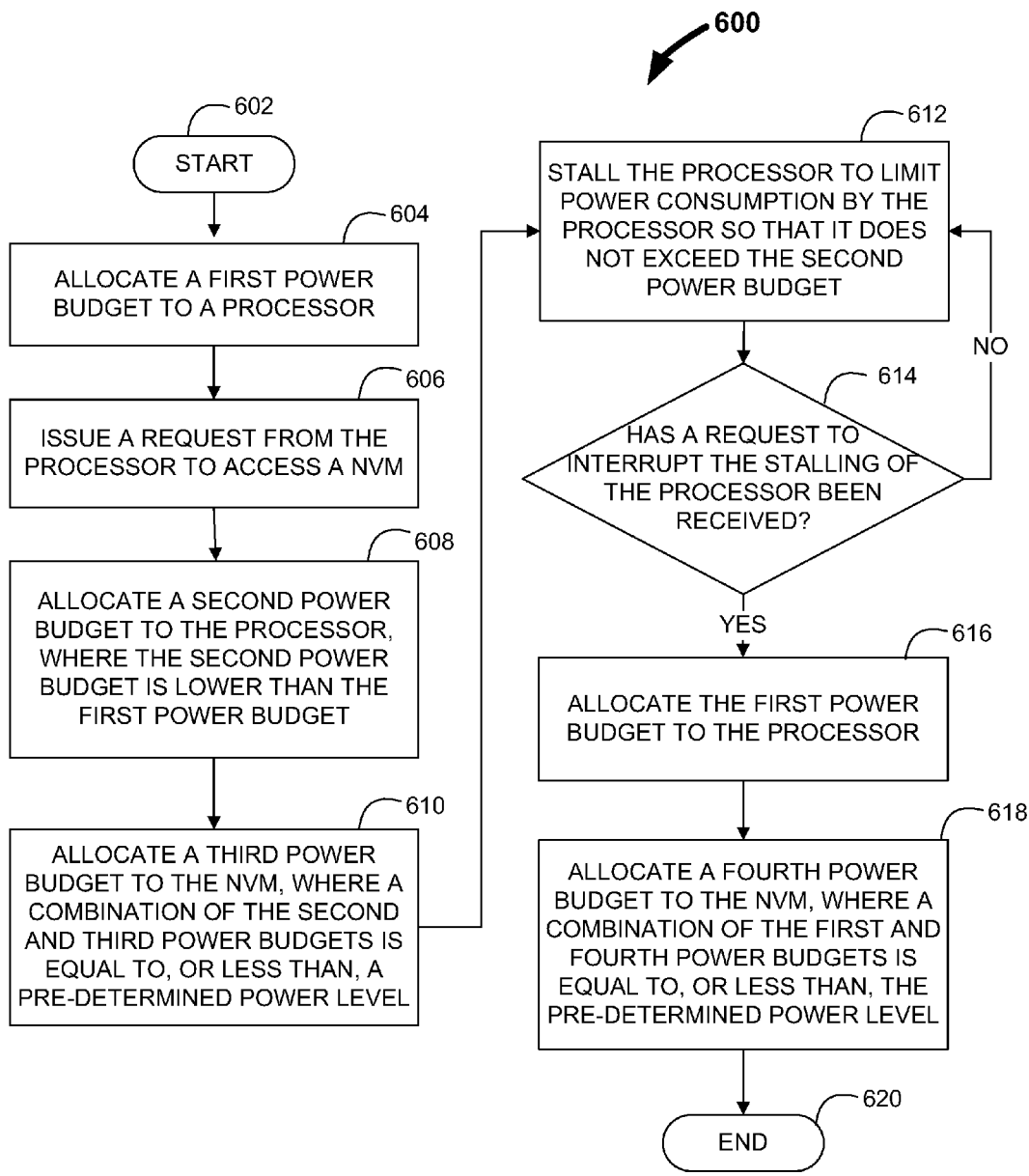
FIG. 6 shows a flowchart of an illustrative process for allocating power budgets in a system in accordance with various embodiments of the invention.

Referring now to FIGS. 5 and 6, flowcharts of illustrative processes are shown in accordance with various embodiments of the invention. These processes may be executed by one or more components in a system (e.g., system 100 of FIG. 1). For example, a power budgeting manager (e.g., power budgeting manager 128 of FIG. 1) may perform one or more of the steps of these processes.

Turning first to FIG. 5, process 500 is shown for dynamic power allocation. Process 500 may begin at step 502, where a power budgeting manager may be monitoring the amount of power available for a system (e.g., electronic device 302 of FIG. 3).

At step 504, the power budgeting manager can determine if the total amount of power available for a system (e.g., electronic device 302 of FIG. 3) is below a pre-determined power level. If, at step 504, the power budgeting manager determines that the total amount of power available for the system is not below a pre-determined power level, process 500 may end at step 506.

If, at step 504, the power budgeting manager instead determines that the total amount of power available for the system is below a pre-determined power level, process 500 may move to step 508. For example, the power budgeting manager may have detected that the system is operating in a low power state. During the low power state, a battery (e.g., battery 308 of FIG. 3) of an electronic device (e.g., electronic device 100 of FIG. 1, electronic device 200 of FIG. 2, and/or electronic device 302 of FIG. 3) may be unable to power the system. At the same time, the electronic device may also be receiving a low amount of power (e.g., a pre-determined power level of 100 mA) from an external power charging device (e.g., external power charging device 310 of FIG. 3). For example, the power budgeting manager may detect the low power state by detecting that the electronic device is communicating with the external power charging device via a USB protocol, and that a handshaking phase of the USB protocol has not yet completed.

Then, at step 508, the power budgeting manager can dynamically allocate a respective power budget to each component of one or more components of the system. In some embodiments, the power budgeting manager can allocate the respective power budgets based on the amount of power that is available. For example, the power budgeting manager can dynamically allocate a power budget to each of a processor (e.g., SoC 110 of FIG. 1 or processor 304 of FIG. 3) and a NVM (e.g., NVM 120 of FIG. 1, NVM 220 of FIG. 2, or NVM 306 of FIG. 3) such that the processor and the NVM can collectively operate without exceeding the pre-determined power level. In other words, the power budgeting manager can monitor the cumulative power consumption of the processor and the NVM, and ensure that the cumulative power consumption does not exceed the pre-determined power level.

In other embodiments, the power budgeting manager can control power consumption of the NVM by, for example, subdividing the power allocated to the NVM to one or more components of the NVM (e.g., one or more NVM dies 124 of FIG. 1 or NVM controller 122 of FIG. 1). In some cases, the power budgeting manager can subdivide the power among the components of the NVM based on a current operating state of the NVM. Thus, depending on which components of the NVM require greater power, the power budgeting manager can correspondingly allocate higher power budgets to those components and lower power budgets to the remaining components.

In further embodiments, the power budgeting manager can monitor the power consumption of various components of the system and allocate power accordingly. Thus, in response to detecting that a particular component of the system is or needs to consume the most power, the power budgeting manager can allocate a correspondingly larger power budget to that component.

By dynamically allocating different power budgets to various components of the system, the power budgeting manager can enhance the performance of the system. For example, if the NVM is not currently being used, the power budgeting manager can allocate a higher power budget to the processor. The processor can then take advantage of this higher power budget by performing additional operations. This enhancement in performance would not be achievable for systems that allocate fixed power thresholds for memory components for a pre-determined period of time.

Continuing to step 510, the power budgeting manager can determine if the total amount of power available for the system is above the pre-determined power level. If, at step 510, the power budgeting manager determines that the total amount of power available for the system is not above the pre-determined power level, process 500 may return to step 508. At step 508, the power budgeting manager can continue to dynamically allocate power budgets to components of the system.

If, at step 510, the power budgeting manager instead determines that the total amount of power available for the system is above the pre-determined power level, process 500 may move to step 512. For example, the power budgeting manager may have detected that the system is operating in a high power state. During the high power state, the electronic device may be receiving a high amount of power (e.g., 500 mA) from the external power charging device. However, a battery of the electronic device may still not be providing any power or power sufficient to power the system. In some embodiments, the power budgeting manager may detect the high power state by detecting that a handshaking phase of the USB protocol between the external power charging device and the electronic device has completed.

As another example, the power budgeting manager may have detected that the system is operating in a full power state. During the full power state, the electronic device may be receiving full power from the external power charging device and/or the battery. In some embodiments, the power budgeting manager can detect that the system is operating in the full power state by detecting that the battery of the electronic device is fully charged.

Then, at step 512, the power budgeting manager can remove the respective power budget allocated to each component of the one or more components of the system. After the respective power budgets have been removed, components of the system can draw as much current as needed from the external power charging device. Process 500 may then end at step 506.

Referring now to FIG. 6, process 600 is shown for allocating power budgets in a system (e.g. electronic device 302 of FIG. 3). In some embodiments, process 600 may represent a more detailed view of step 508 of process 500 (FIG. 5). Thus, the system may be operating in a low power state, where the system is receiving power from an external power charging device (e.g., external power charging device 310 of FIG. 3) and the internal power source (e.g., battery 308 of FIG. 3) is not able to independently power the system. In some embodiments, the total received power can have a pre-determined power level (e.g., 100 mA).

Although the following discussion refers to stalling a processor (e.g., SoC 110 of FIG. 1 or processor 304 of FIG. 3) in response to a low power state, persons skilled in the art will appreciate that similar approaches can also be applied to a processor of a NVM (e.g., NVM 120 of FIG. 1, NVM 220 of FIG. 2, or NVM 306 of FIG. 3), such as a NVM controller (e.g., NVM controller 122 of FIG. 1). Thus, if the low power state continues for a longer period of time, the processor and the NVM controller may alternate the stalling process in order to enhance the performance of the system.

Process 600 may start at step 602. At step 604, a power budgeting manager (e.g., power budgeting manager 128 of FIG. 1) can allocate a first power budget (e.g., power budget 402 of FIG. 4) to the processor.

Then, at step 606, the processor may issue a request (e.g., a read, erase, or program request) to access a NVM (e.g., NVM 120 of FIG. 1, NVM 220 of FIG. 2, or NVM 306 of FIG. 3). For example, the processor can issue a read request to access data stored in memory locations of one or more NVM dies (e.g., NVM dies 124 of FIG. 1). As another example, the processor can issue a program request to program data into memory locations of one or more NVM dies. In some embodiments, in order to conserve power while operating in the low power state, the processor or a NVM controller (e.g., NVM controller 122 of FIG. 1) can limit the request to access only one die of the NVM at a time. In other embodiments, other system operations can be blocked while input/output ("I/O") signals are being transferred between the processor and the NVM controller.

Continuing to step 608, the power budgeting manager can allocate a second power budget (e.g., power budget 406 of FIG. 4) to the processor, where the second power budget may be lower than the first power budget. A lower amount of power can be allocated to the processor because after issuing the request, the processor may not need to perform any other significant operations.

At step 610, the power budgeting manager can allocate a third power budget (e.g., power budget 408 of FIG. 4) to the NVM, where a combination of the second and third power budgets is equal to, or less than, a pre-determined power level (e.g., power level 420 of FIG. 4). In some cases, because the NVM may be performing most of the system operations after receiving a request from the processor, the NVM may require additional power as compared to the processor. Thus, the third power budget can be higher than the second power budget.

Then, at step 612, the power budgeting manager can stall the processor to limit power consumption so that the processor does not exceed the second power budget. For example, the processor can stall by clock gating (e.g., by disabling one or more portions of the processor circuitry). As another example, the processor can stall by throttling its clock speed (e.g., reducing its clock speed to a minimum level).

Continuing to step 614, the power budgeting manager can determine if a request to interrupt the stalling of the processor has been received. For example, the power budgeting manager may receive an interrupt request from one or more components of an electronic system (e.g., electronic system 300 of FIG. 3). For instance, the power budgeting manager (and/or the processor) may receive an interrupt request from a component of an electronic device (e.g., electronic device 100 of FIG. 1, electronic device 200 of FIG. 2, and/or electronic device 302 of FIG. 3) or an external power charging device (e.g., external power charging device 310 of FIG. 3) coupled to the electronic device.

In some embodiments, the power budgeting manager can receive an interrupt request from the NVM. For example, a NVM controller can provide an interrupt request to the processor instructing the processor to operate at a higher power level. In some embodiments, the interrupt request may be transmitted in order to allow the transfer of I/O signals between the processor and the NVM controller. As another example, the NVM controller can issue one or more flags, where the one or more flags can indicate when one or more memory operations have completed.

If, at step 614, the power budgeting manager determines that a request to interrupt the stalling has not been received, process 600 may return to step 612. At step 612, the power budgeting manager can continue to stall the processor.

If, at step 614, the power budgeting manager instead determines that a request to interrupt the stalling has been received, process 600 may move to step 616.

At step 616, the power budgeting manager can allocate the first power budget to the processor. In some embodiments, the first power budget may be allocated because the processor may require a higher amount of power in order to continue performing system operations (e.g., transferring I/O signals to or from the NVM controller).

Then, at step 618, the power budgeting manager can allocate a fourth power budget (e.g., power budget 404 of FIG. 4) to the NVM, where a combination of the first and fourth power budgets is equal to, or less than, the pre-determined power level. In some cases, because the processor may be performing most of the system operations after the stalling has been interrupted, the processor may require additional power as compared to the NVM. Thus, the first power budget may be higher than the fourth power budget. Process 600 can then end at step 620.

It should be understood that processes 500 and 600 of FIGS. 5 and 6, respectively, are merely illustrative. Any of the steps may be removed, modified, or combined, and any additional steps may be added, without departing from the scope of the invention.

The described embodiments of the invention are presented for the purpose of illustration and not of limitation.

What is claimed is:
1. A method for dynamically managing power in a system comprising a processor and non-volatile memory ("NVM"), the method comprising:
   detecting that the system is communicating with an external power charging device during a handshaking phase such that the system receives power from the external power charging device, wherein the received power has a pre-determined power level;
dynamically allocating a power budget to each of the processor and the NVM such that the processor and the NVM collectively operate without exceeding the pre-determined power level, wherein dynamically allocating the power budget further comprises:
  detecting whether a request to access the NVM has been issued from the processor;
  in response to detecting that a request to access the NVM has been issued from the processor, allocating a lower power budget to the processor as compared to the NVM;
  allocating a first power budget to the processor prior to detecting that the request to access the NVM has been issued;
  upon detecting that the request to access the NVM has been issued, allocating a second power budget to the processor, wherein the second power budget is lower than the first power budget; and
  stalling the processor to limit power consumption by the processor so that it does not exceed the second power budget;
determining if the received power is above the pre-determined power level; and
removing the respective power budget allocated to each of the processor and the NVM if the received power is above the pre-determined power level.

2. The method of claim 1, wherein a battery of the system is unable to independently provide sufficient power to the system so that the system can operate in a normal mode.

3. The method of claim 1, wherein the stalling further comprises clock gating the processor.

4. The method of claim 1, wherein the stalling further comprises throttling the clock speed of the processor.

5. The method of claim 1, further comprising allocating a third power budget to the NVM, wherein a combination of the second and third power budgets is equal to or less than the pre-determined power level.

6. The method of claim 5, wherein the third power budget is higher than the second power budget.

7. The method of claim 5, further comprising:
  receiving a request to interrupt the stalling of the processor; and
  in response to receiving the request to interrupt the stalling of the processor, allocating the first power budget to the processor.

8. The method of claim 7, wherein the receiving the request to interrupt further comprises receiving a flag, wherein the flag indicates when at least one memory operation has completed.

9. The method of claim 7, further comprising allocating a fourth power budget to the NVM, wherein a combination of the first and fourth power budgets is equal to or less than the pre-determined power level.

10. The method of claim 8, wherein the first power budget is higher than the fourth power budget.

11. A system comprising:
  a processor;
  a non-volatile memory ("NVM") operative to communicate with the processor, the NVM comprising a NVM controller; and
  a power budgeting manager operative to:
    detect that the system is operating below a pre-determined power level as part of a handshaking phase;
    dynamically allocate a power budget to each of the processor and the NVM such that the processor and the NVM collectively operate without exceeding the pre-determined power level;
    detect whether a request to access the NVM has been issued from the processor;
    in response to detecting that a request to access the NVM has been issued from the processor, allocating a lower power budget to the processor as compared to the NVM;
    allocate a first power budget to the processor prior to detecting that the request to access the NVM has been issued;
    upon detecting that the request to access the NVM has been issued, allocate a second power budget to the processor, wherein the second power budget is lower than the first power budget; and
    stall the processor to limit power consumption by the processor so that it does not exceed the second power budget;
    detect that the system is operating above the pre-determined power level; and
    remove the respective power budget allocated to each of the processor and the NVM if the received power is above the pre-determined power level.

12. The system of claim 11, wherein the power budgeting manager is implemented on at least one of the processor and the NVM controller.

13. The system of claim 11, wherein the NVM controller is operative to provide an interrupt request to the processor instructing the processor to operate at a higher power level.

14. The system of claim 11, wherein the power budgeting manager is operative to:
  monitor an amount of power that is available; and
  allocate a power budget to each component of a plurality of components of the system based on the amount of power available.

15. The system of claim 14, wherein the plurality of components of the system comprises at least one of the processor and the NVM.

16. The system of claim 14, wherein the power budgeting manager is operative to detect a state that is associated with the amount of available power.

17. A method for dynamically managing power in a system comprising a processor and non-volatile memory ("NVM"), the method comprising:
  detecting that the system is communicating with an external power charging device during a handshaking phase such that the system receives power from the external power charging device, wherein the received power has a pre-determined power level;
  dynamically allocating a power budget to each of the processor and the NVM such that the processor and the NVM collectively operate without exceeding the pre-determined power level, wherein dynamically allocating the power budget further comprises:
    allocating a first power budget to the processor;
    issuing a request from the processor to access the NVM, wherein the issuing the request comprises limiting the request to access a subset of all available dies of the NVM at a time, the subset including a number of dies less than all dies that can be simultaneously accessed;
    allocating a second power budget to the processor, wherein the second power budget is lower than the first power budget; and stalling the processor to limit power consumption by the processor so that it does not exceed the second power budget;

determining if the received power is above the pre-determined power level; and removing the respective power budget allocated to each of the processor and the NVM if the received power is above the pre-determined power level.

* * * * *

UNITED STATES PATENT AND TRADEMARK OFFICE
CERTIFICATE OF CORRECTION

PATENT NO.       : 8,826,051 B2                                Page 1 of 1
APPLICATION NO.  : 12/843423
DATED            : September 2, 2014
INVENTOR(S)      : Nir J. Wakrat et al.

It is certified that error appears in the above-identified patent and that said Letters Patent is hereby corrected as shown below:

On the Title Page, Item (54) and in the Specification, in Column 1, under "Title", Lines 2-3, delete "HAVING NON-VOLATILE" and insert -- HAVING A NON-VOLATILE --, therefor.

In the Specification

In Column 8, Line 22, delete "time t/because" and insert -- time $t_1$ because --, therefor.

Signed and Sealed this
Twenty-first Day of July, 2015

Michelle K. Lee
*Director of the United States Patent and Trademark Office*